United States Patent [19]

Becker

[11] Patent Number: 4,551,065
[45] Date of Patent: Nov. 5, 1985

[54] COMPOSITE HORIZONTALLY OR VERTICALLY SPLIT CASING WITH VARIABLE CASING ENDS

[76] Inventor: John H. Becker, 500 Meilleur St., Sherbrooke, Quebec J1H 3X4, Canada

[21] Appl. No.: 449,505

[22] Filed: Dec. 13, 1982

[51] Int. Cl.[4] ........................................... F01D 25/24
[52] U.S. Cl. .......................... 415/219 R; 415/213 C; 220/3
[58] Field of Search .............. 415/219 R, 213 C, 201, 415/219 C; 220/3, 5 A, 466, 467

[56] References Cited

U.S. PATENT DOCUMENTS

| 1,743,877 | 1/1930 | Broido | 220/3 |
| 3,087,883 | 4/1963 | Haftke | 220/3 |
| 3,169,749 | 2/1965 | Harris | 415/219 R |
| 3,235,344 | 2/1966 | Dreyer et al. | 220/3 |
| 3,741,680 | 6/1973 | Killmann et al. | 415/219 R |
| 3,815,773 | 6/1974 | Duvall et al. | 220/3 |
| 4,137,006 | 1/1979 | Becker | 415/219 R |
| 4,304,038 | 12/1981 | Yabu et al. | 220/3 |
| 4,305,192 | 12/1981 | Becker | 29/463 |

Primary Examiner—Henry C. Yuen
Assistant Examiner—John Kwon
Attorney, Agent, or Firm—Thompson, Birch, Gauthier & Samuels

[57] ABSTRACT

Standard casing ends are formed for horizontally or vertically split casings. The casing end includes a variable dimensioned extension which is adapted to abut a shell section. The casing also includes a variable dimensioned stub end adapted to abut a nozzle. Once a shell thickness is determined, the extension is trimmed back to match the thickness of the shell section. The stub end is trimmed back and its inner diameter is enlarged, if necessary, to match the dimensions of a selected nozzle.

3 Claims, 4 Drawing Figures

TYPICAL SECTION
HORIZONTAL SPLIT
CASING

FIG. 2 TYPICAL SECTION HORIZONTAL SPLIT CASING

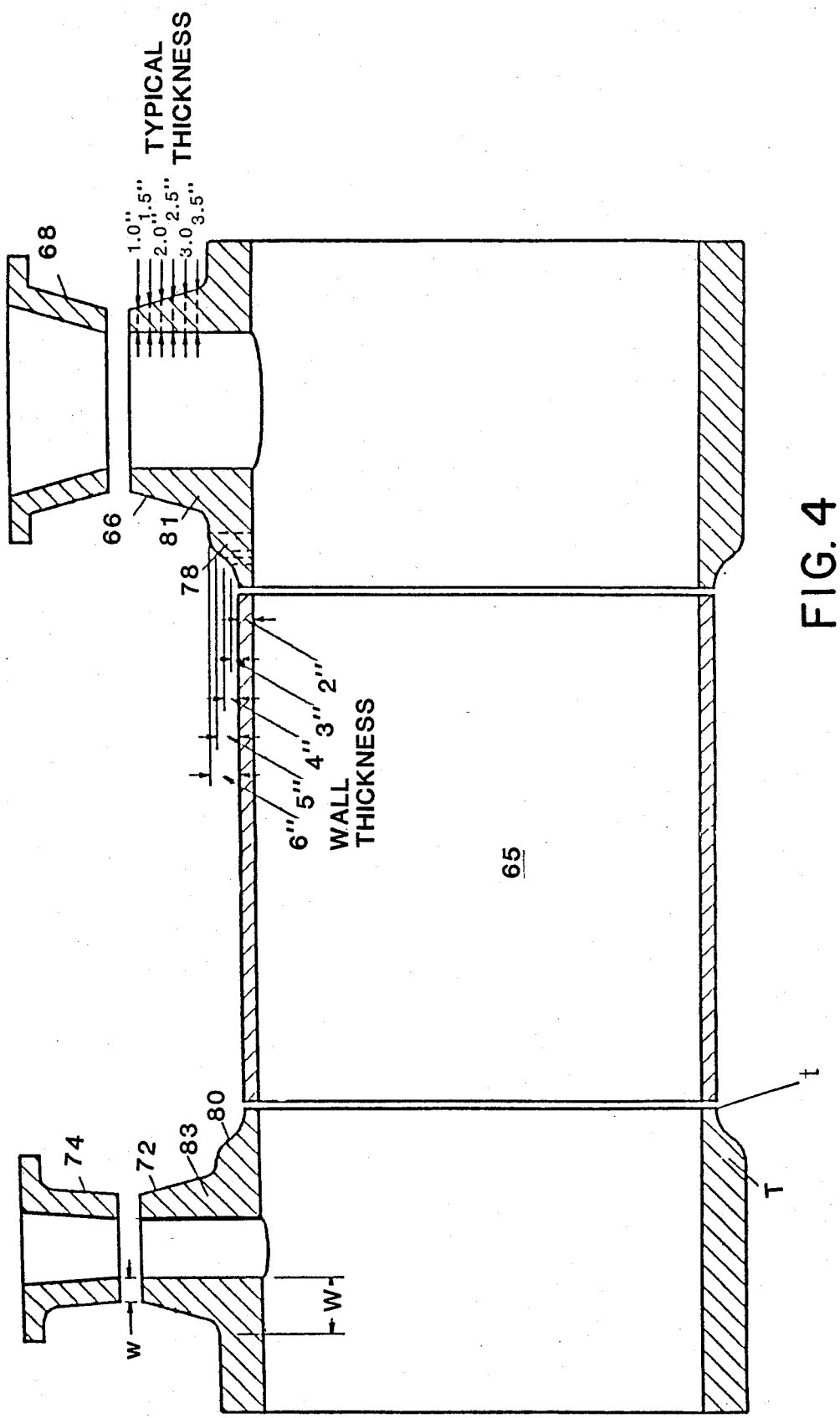

COMPOSITE HORIZONTALLY OR VERTICALLY SPLIT CASING WITH VARIABLE CASING ENDS

BACKGROUND AND BRIEF SUMMARY OF THE INVENTION

This invention is an improvement in part of the inventions described and claimed in my prior issued U.S. Pat. Nos. 4,305,192 and 4,137,006.

In these patents which are incorporated by reference in this disclosure in their entireties, composite horizontally and vertically split casings are described wherein a casing can be readily fabricated to any desired length using standard cast casing ends (inlet and outlet sections) and differing shell plate lengths. By varying the shell plate length the volume of the compressor is varied, while the pressure remains essentially constant. However where the pressure requirements for a casing change entire new casing inlet and outlet sections must be fabricated.

It is not believed that there is now commercially available standard cast inlet and outlet sections which may be easily modified to satisfy a pressure rating or design requirement within a range of pressure ratings. That is, once a pressure rating is established for a compressor, inlet and outlet sections are specifically fabricated.

The present invention is broadly directed to inlet and outlet sections which are used with horizontally or vertically split casings and which once fabricated may be easily modified to satisfy a specific pressure rating within a range of possible pressure ratings.

In the present invention, standard inlet and outlet sections are formed. That portion of each section which abuts the shell section is characterized by a variable-dimensioned extension. Further the sections include variable-dimensioned stub ends for inlet and outlet nozzles. The extensions can be modified to mate with a shell plate which shell plate is designed for a specific pressure rating and the stub ends can be modified to mate with specific inlet and outlet nozzles.

In many industries which require compressors of the type herein described, a typical pressure rating would be initially based on the shell section thickness and of necessity, the inlet and outlet sections of corresponding thickness to which it is welded. In some instances, the users of such compressors will request the manufacturers of the compressors to keep in stock matching sets of shells and inlet and outlet sections designed for various pressure ratings.

Each cylinder or compressor housing has unique design parameters and pressure parameters. Contained housings can vary in shape but probably over 95% used are cylindrical in shape. A simplified formula for pressure rating is:

$$Th = PR/SE$$ or $$P = ThSE/R$$

Th = wall thickness
P = pressure in psi
S = unit tensile strength for any given material (usually steel)
E = weld joint efficiency
R = radius of housing
The pressure formula, then:

$$P = ThSE/R$$

and, as a practical matter, the values of S and E are constant whereby $P = Th/R$, $RP = Th$. Thus, if R is held constant, say to 30 inch radius, then the wall thickness (Th) varies directly as the pressure. Therefore, where each has a wall thickness which varies basically with pressure, each compressor casing design is unique unto itself because of its pressure rating. Correspondingly the inlet and outlet nozzles will vary in internal diameter and wall thickness and the nozzles of the casings must be designed accordingly.

Each compressor casing must then require its own design, drawings, bills of material specifically unique to its own pressure, and each compressor casing of varying pressures must then have its own unique inventory, lead time, production standards, methods and test data.

The present invention overcomes the necessity to maintain in inventory a plurality of inlet and outlet sections covering all possible dimensions to accomodate various pressure designs as required by the ultimate user.

BRIEF DESCRIPTION OF THE DRAWINGS

FIG. 4 is a side sectional view of the assembled casing of FIG. 3.

DESCRIPTION OF THE PREFERRED EMBODIMENT

Figure 1:
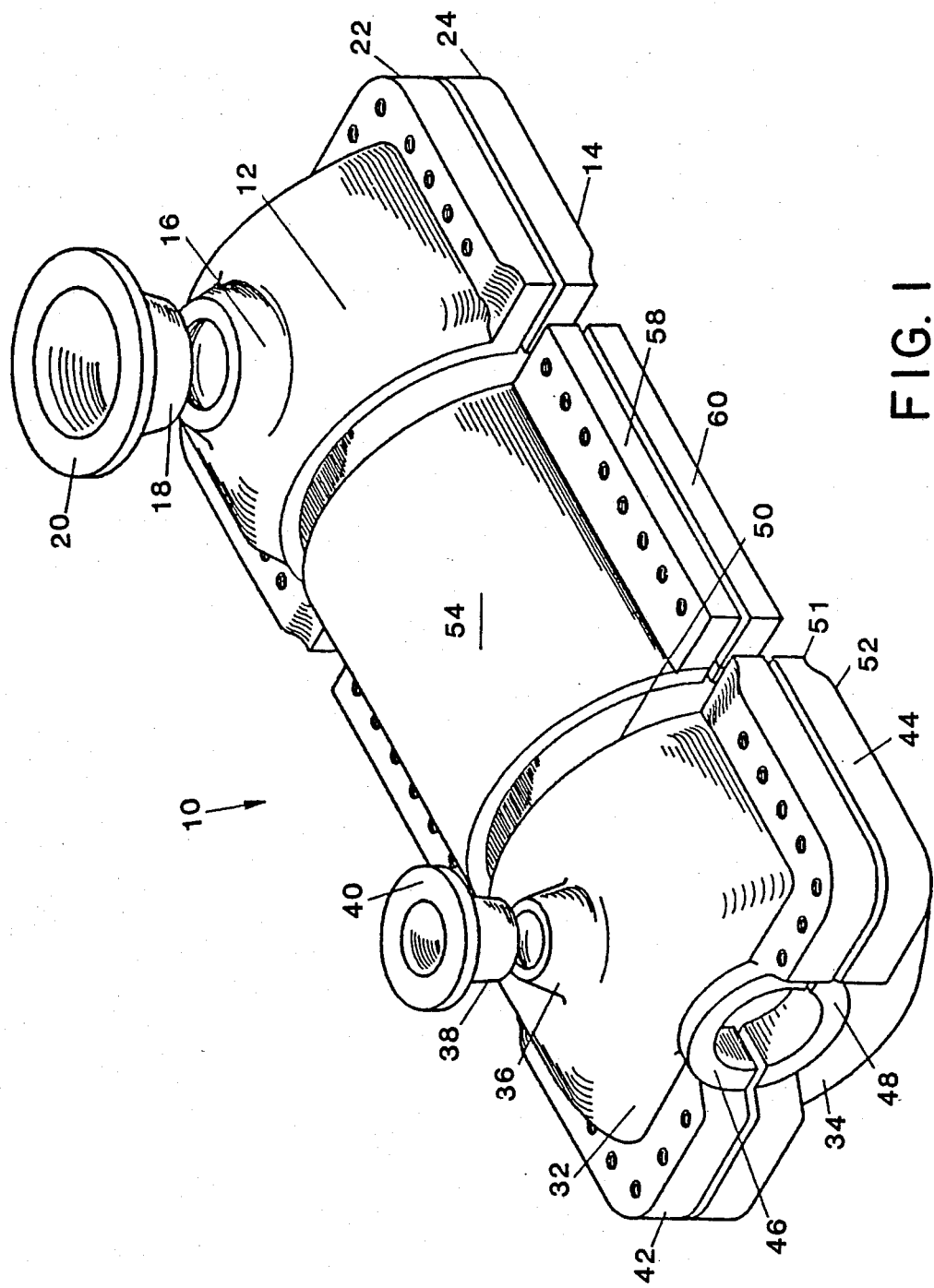
FIG. 1 is a perspective exploded view of a horizontally split casing embodying the concepts of the present invention.

Referring to FIG. 1, a horizontally split casing in accordance with the present invention is generally indicated at 10. Beginning at the right hand end as viewed in the FIG. 1, it can be seen that the casing 10 includes upper and lower cast inlet sections 12 and 14 with closed ends. The upper inlet section 12 comprises a single integrally cast component having a stub end 16 to which is subsequently joined an inlet nozzle 18 with an upper flange 20; and a horizontal bolting flange 22. The lower inlet section 14 is cast as a mating half for the upper inlet section 12 (less a stub end) and is provided with a horizontal bolting flange 24.

Figure 2:
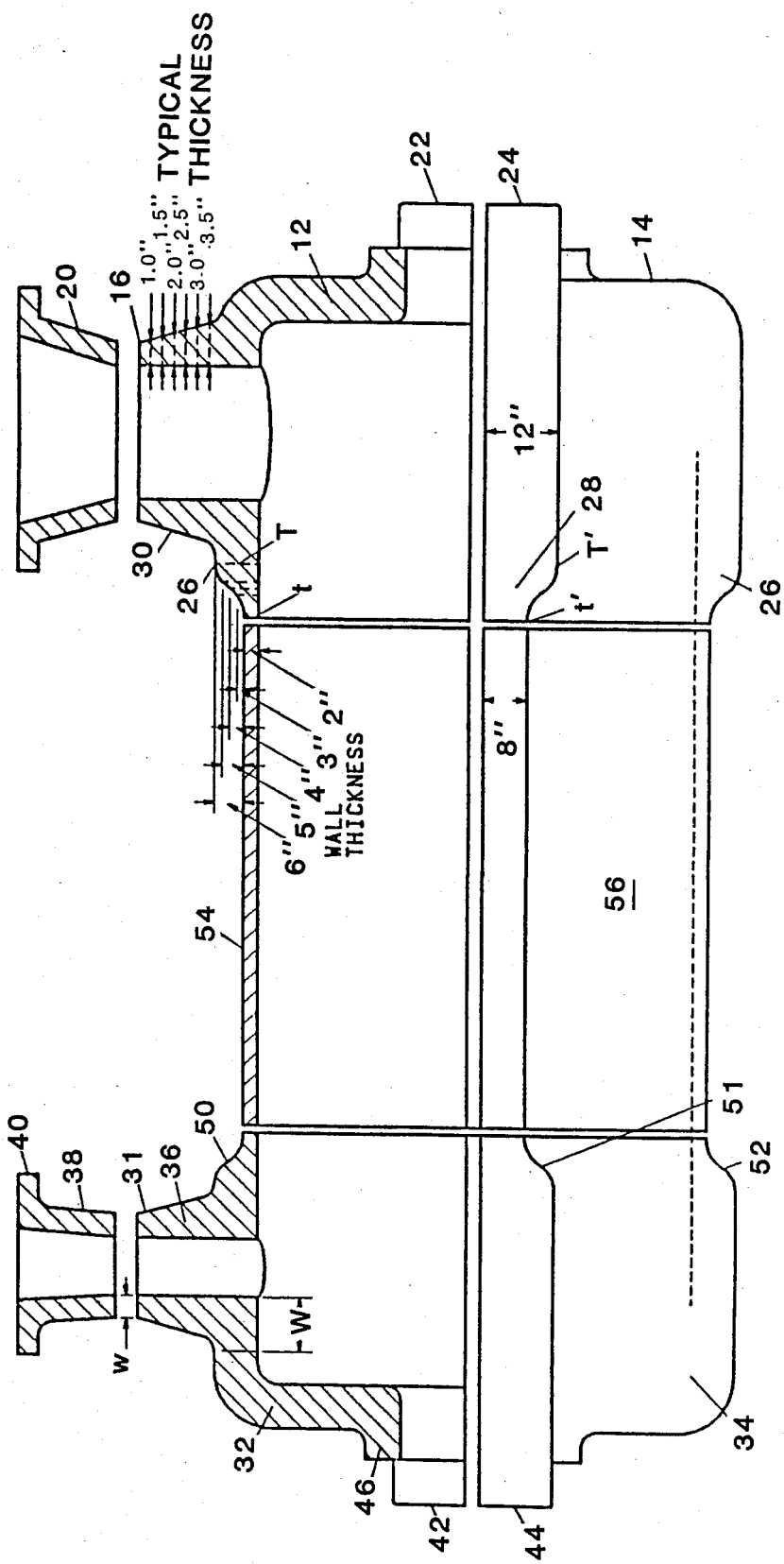
FIG. 2 is a side view of the assembled casing of FIG. 1 with the upper half being in section.

Referring to FIG. 2, the inwardly facing ends of the upper and lower sections 12 and 14 diminish from a maximum thickness T to a minimum thickness t; similarly, the bolting flanges diminish from a maximum thickness T' to a minimum thickness of t', thereby forming trapezoidal-like extensions (the non-parallel sides comprising a straight line and a curved line) when viewed in section. The sections 12 and 14 include extensions 26 and the horizontal bolting flanges 22 and 24 include extensions 28. The extension for the flange 22 is not shown in FIG. 2. As viewed in section, in FIG. 2, the walls of the stub ends 16 and 36 diminish from a maximum thickness W to a minimum thickness w forming trapezoidal extensions 30 and 31.

At the opposite left hand end as viewed in FIG. 1, casing 10 further includes upper and lower cast outlet sections 32 and 34. The upper outlet section 32 is an integrally cast component having a stub end 36 to which is subsequently joined an outlet nozzle 38 with an upper flange 40; and a horizontal bolting flange 42. The lower outlet section 34 is cast as a mating half for the upper outlet section 32 (less a stub end) and is provided with a horizontal bolting flange 44. The upper outlet section 32 and lower outlet section 34 also include bearing ring support flanges 46 and 48 respectively. The upper and lower inlet sections 12 and 14 also include bearing ring support flanges but they are not shown in FIG. 1.

The inwardly facing ends of the upper and lower sections 32 and 34 together with the associated bolting flanges 42 and 44 include trapezoidal-like extensions as described for the facing ends of the upper and lower inlet sections 12 and 14. The outlet sections 32 and 34 also include trapezoidal-like extensions 50 and 52; and the horizontal bolting flanges 42 and 44 also include extensions 51 and 53 (53 not shown). The extension for the flange 42 is not shown in FIG. 2.

Casing 10 further includes semi-cylindrical upper and lower shell sections 54 and 56. These shell sections are initially formed as flat hot rolled plates which are subsequently bent into the semi-cylindrical shape shown in FIGS. 1 and 2. Upper and lower horizontally extending bolting flanges 58 and 60 are associated with the upper and lower shell sections 54 and 56.

When assembled, as shown in FIGS. 1 and 2, the flat inwardly facing surfaces of the extensions of the inlet and outlet sections; and the flat inwardly facing surfaces of the flanges are secured by welding to the outwardly facing surfaces of the upper and lower shells and their associated bolting flanges. The nozzles 18 and 38 are welded to the stub ends 16 and 36. The casing preferably is assembled in the manner described in my aforementioned patents.

Figure 3:
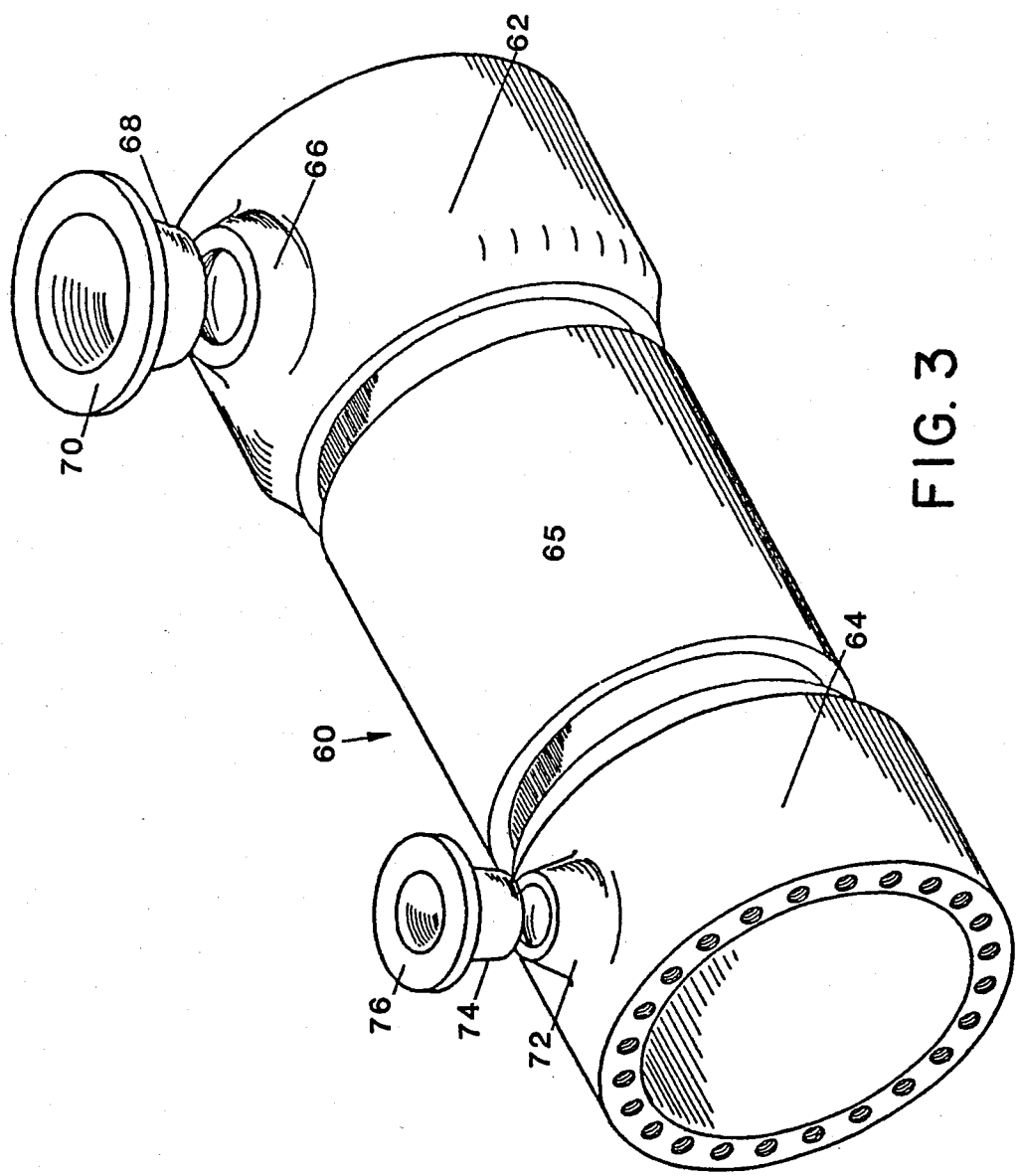
FIG. 3 is a perspective exploded view of a vertically split casing embodying the concepts of the present invention.

Referring to FIG. 3, the inventive concept is shown incorporated in a vertically split casing shown generally at 60. The casing 60 comprises inlet and outlet casing sections 62 and 64 respectively; and a shell section 65. The end housings normally associated with vertically split casings are not shown. The inlet section 62 includes stub end 66 to which is joined an inlet nozzle 68 having an upper flange 70.

The outlet end 64 includes a stub end 72 to which is joined an outlet nozzle 74 having an upper flange 76. Referring to FIG. 3 the sections 62 and 64 each contain inwardly facing extensions which diminish from a maximum thickness T to a minimum thickness t thereby forming trapezoidal-like extensions 78 and 80 respectively. The walls of the stub ends 66 and 72 diminish from a maximum thickness W to a minimum thickness w forming trapezoidal sections 81 and 83. When assembled, as shown in FIGS. 3 and 4 the flat inwardly facing surfaces of the sections 62 and 64 are secured by welding to the outwardly facing surfaces of the shell section 65. The nozzles 68 and 74 are welded to the stub ends 66 and 72. When a casing (compressor) of a specific pressure rating is desired the wall thickness of the shell is calculated first based on the pressure to be experienced as previously set forth. Typically the calculated value is added to allow for a corrosion factor and/or added to allow for vibration, stability and hoop stress. The pressure rating also influences the dimensions of the inlet and outlet nozzles both as to wall thickness and inside diameter.

As an example of the application of the inventive concepts if it is determined that the shell thickness of a 30" vertically split casing is to be 3"; then referring to FIGS. 3 and 4 the shell section 65 is initially formed with a 3" wall thickness. From inventory standard inlet and outlet sections 62 and 64 are modified. The extensions 78 and 80 are trimmed back until the facing surfaces have a thickness of 3". The inlet and outlet nozzle requirements are determined. If the inlet nozzle will have a wall thickness of $2\frac{1}{2}$" and an inner diameter of 16" two operations are performed on the stub end 66. The stub end 66 is trimmed back to $2\frac{1}{2}$" and the stub end inner diameter is enlarged to 16". In a similar manner the stub end 72 is modified to its required dimensions.

The sections 62 and 64 are welded to the shell section 65; and the inlet nozzle 68 is welded to the stub end 66; and the outlet nozzle 74 is welded to the stub end 72.

The inlet and outlet sections of horizontally split casings are modified in the same way with the additional proviso that the horizontal bolting flanges are trimmed accordingly.

Therefore with my invention standard inlet and outlet sections may be maintained in inventory and modified to satisfy a range of pressure ratings.

Although the invention has been described with reference to particular composite horizontally and vertically split casings, the casings do not have to be assembled specifically as described in the aforementioned patents.

Having described my invention what I now claim is:
1. A method of fabricating a casing which comprises:
   forming an inlet section and an outlet section, each section having a one end and another end, the other end of one of the sections having an extension which diminishes from a maximum thickness T to a minimum thickness t, the extension when viewed in section being a trapezoidal-like section;
   forming a shell section having outwardly facing surfaces of a given thickness;
   trimming back the extension of the outer end of the one section until the extension terminates in an inwardly facing flat surface which is equal in thickness to the thickness to the inwardly facing surface of the shell section;
   abutting the outwardly facing surfaces;
   welding said surfaces together; and
   joining the other of said sections to the shell casing to form a composite casing.
2. The method of claim 1 wherein the trimmed section is the inlet section and the inlet section is welded to one outwardly facing surface of the shell section and which includes joining the outlet section to the shell section by
   trimming back the extension of the outlet section until the extension terminates in an inwardly facing surface which is equal in thickness to the other outwardly facing surface of the shell section;
   abutting said outwardly facing surfaces; and
   welding said surfaces together to form a composite casing.
3. The method of claim 1 wherein the casing is a horizontally split casing and the shell section includes horizontally extending bolting flanges having outwardly facing surfaces of a given thickness the inlet and outlet section having horizontally extending bolting flanges each having extensions which diminish from a maximum thickness T' to a minimum thickness t' which includes:
   trimming back the extension of the bolting flanges of the inlet and outlet sections until the extensions terminate in outwardly facing surfaces which are equal in thickness to the outwardly facing surface of the bolting flanges of the shell section; and
   welding said surfaces together to form a composite casing.

* * * * *